United States Patent [19]
Lee et al.

[11] Patent Number: 5,617,149
[45] Date of Patent: Apr. 1, 1997

[54] APPARATUS AND METHOD FOR DETECTING SCENE CHANGES USING THE DIFFERENCE OF MAD BETWEEN IMAGE FRAMES

[75] Inventors: Hyun J. Lee; Sang M. Lee; Yong H. Kim, all of Daejeon, Rep. of Korea

[73] Assignees: Electronics and Telecommunications Research Institute; Korea Telecommunication Authority, both of Rep. of Korea

[21] Appl. No.: 343,235

[22] Filed: Nov. 22, 1994

[51] Int. Cl.$^6$ ............................................. H04N 7/32
[52] U.S. Cl. ........................ 348/699; 348/416; 348/700
[58] Field of Search ................................ 348/699, 416, 348/407, 402, 413, 700; H04N 7/32

[56] References Cited

U.S. PATENT DOCUMENTS

| | | | |
|---|---|---|---|
| 4,700,388 | 10/1987 | Okada et al. ........................... | 380/20 |
| 4,823,184 | 4/1989 | Belmares-Sarabia et al. ......... | 348/700 |
| 5,072,293 | 12/1991 | De Haan et al. ...................... | 348/699 |
| 5,327,232 | 7/1994 | Kim ........................................ | 348/699 |
| 5,351,095 | 9/1994 | Kerdranvat ............................. | 348/699 |
| 5,355,168 | 10/1994 | Sugiyama ............................... | 348/407 |
| 5,365,281 | 11/1994 | Ko et al. ................................. | 348/700 |
| 5,387,947 | 2/1995 | Shin ........................................ | 348/699 |
| 5,412,435 | 5/1995 | Nakajima ................................ | 348/699 |
| 5,438,374 | 8/1995 | Yan ......................................... | 348/416 |
| 5,440,350 | 8/1995 | Golin ...................................... | 348/699 |
| 5,448,310 | 9/1995 | Kopet et al. ............................ | 348/699 |
| 5,453,801 | 9/1995 | Kim ........................................ | 348/699 |
| 5,477,278 | 12/1995 | Kitaura et al. ......................... | 348/699 |
| 5,481,310 | 1/1996 | Hibi ........................................ | 348/416 |
| 5,488,430 | 1/1996 | Hong ...................................... | 348/416 |
| 5,510,834 | 4/1996 | Weiss et al. ............................ | 348/699 |

OTHER PUBLICATIONS

Document AVC-275, "Scene Change Handling in Low Delay Mode", Jul. 1992, pp. 1–11.

*Primary Examiner*—Tommy P. Chin
*Assistant Examiner*—Vu Le
*Attorney, Agent, or Firm*—Merchant, Gould, Smith, Edell, Welter & Schmidt

[57] ABSTRACT

An apparatus and a method for detecting scene change using difference of MAD(Mean Absolute Difference), so called dMAD wherein the method for detecting scene change using difference of mean absolute difference(dMAD) between image frames by use of scene change detecting apparatus comprising frame memory, first absolute calculator, accumulator, multiplicator, first latch circuit, second absolute calculator, first comparator, second comparator, selector and second latch circuit, the method comprising the steps of: (A) calculating MAD of the 'n'th input image frame and checking whether scene change judgement variable, which is used for current frame according to scene change of previous frame, is '1'; (B) judging scene change only using MAD since current frame corresponds to the second frame of new scene when scene change variable is '1' at said step (a); (C) judging scene change using dMAD as scene change variable when scene change variable is not '1' at said step (a); (D) saving scene change state and MAD of the 'n'th frame so as to use them for the processing of the 'n+1'th frame.

3 Claims, 4 Drawing Sheets

APPARATUS AND METHOD FOR DETECTING SCENE CHANGES USING THE DIFFERENCE OF MAD BETWEEN IMAGE FRAMES

BACKGROUND OF THE INVENTION

1. Field of the Invention

The present invention relates to an apparatus and method for detecting scene changes using the difference of mean absolute difference(dMAD) between image frames.

2. Description of the Prior Art

In general, scene change data is very useful for predictive coding of digital image signal, and intraframe coding should be performed for the first frame after a scene change since the occurrence of the scene change makes prediction of current frame over previous frame invalid.

Scene change data in Macro Block unit is utilized most usefully for bit rate control process of image encoder, which applies intraframe encoding mode or interframe predictive coding according to their characteristics. If there is no scene change detection process, most macro blocks of the first frame after the scene change will actually be processed under intraframe coding mode even if it is originally under interframe predictive coding mode. In this case, the balance of bit rate control will be broken due to the generation of data which far outnumbers the number of bits targeted. Additionally, the quality of the image after the current frame will be downgraded considerably. So, for adaptation predictive coding, it is very important to choose either intraframe coding or interframe coding by doing scene change judgement before coding each frame. As criteria for scene change, difference of frames, correlation between frames, average brightness of frame, quantization control characteristic curve, and so on, are generally used because of easiness of evaluation.

FIG. 1 shows flow chart of conventional cases for scene change judgement using interframe difference.

As shown FIG. 1, the scene change judgement method includes step 1 for calculating the value of MAD between previous frame and current frame, step 2 for comparing the resultant output generated in the step 1 with threshold value, step 3 for estimating to be occurred scene change when the resultant output generated in the step 1 is greater than the threshold value, step 4 for estimating to be not occurred scene change when the resultant output generated in step 1 is smaller than or equal to the threshold value. Scene change data given from the steps 3, 4 could be utilized for bit rate control of encoder. In the conventional method, there is a high possibility of misjudgement for the scenes moving in the wide range that scene changes for almost every frame have occurred even though no scene changes have actually occurred. This is because it is difficult to distinguish them from virtual scene change due to MAD of each frame greater than threshold value when the scenes are moving in the wide range.

SUMMARY OF THE INVENTION

Therefore, an object of the invention is to solve the above-mentioned problems encountered in the prior art and, thus provide an apparatus for and a method of detecting scene changes using difference of mean absolute difference between image frames, capable of achieving low judgement error rate.

In accordance with one aspect, the present invention provides an apparatus for detecting scene change using difference of mean absolute difference between image frames, the apparatus comprising; frame memory for saving input signal $f_n$, first absolute difference calculation means for caculating absolute difference between the input signal $f_n$ and the output signal $f_{n-1}$ of the frame memory, accumulation means for accumulating the absolute difference, mutiplication means for multiplying output of the accumulation means by a constant factor to get MDA(Means Absolute Difference), first latch means for saving the MDA during a frame time, second absolute difference calculation means for calculating dMAD(n) between output of the multiplication means, MAD(n) and output of the first latch means, MAD(n−1), first comparison means for comparing absolute difference from the second absolute difference calculation means with second threshold value so as to judge scene change, second comparison means for comparing only the MAD of corresponding frame from the multiplication means with first threshold value, selection means for selecting either the first comparison means or the second comparison means to be used and outputting scene change data, and second latch means for saving the scene change data from the selection means and providing the scene change data corresponding previous frame to said selection so as to select the first or the second comparison means.

In accordance with another aspect, the present invention provides a method for detecting scene change using difference of mean absolute difference between image frames, the method comprising the steps of; (a) calculating MAD of the 'n'th input image frame and checking whether scene change judgement variable, which is used for current frame according to scene change of previous frame, is '1'; (b) judging scene change only using MAD since current frame corresponds to the second frame of new scene when scene change variable is '1'; (c) judging scene change using dMAD as scene change variable when scene change variable is not '1'; and (d) saving scene change state and MAD of the 'n'th frame so as to use them for processing of the 'n+1'th frame.

MAD of brightness signal (Y) between two frames is defined as follows.

$$\text{MAD} = \left\{ \sum_{j=0}^{N-1} \sum_{i=0}^{M-1} |f_n(i,j) - f_{n-1}(i,j)| \right\} \times \text{FACTOR}$$

$f_n(i,j)$: image signal of the 'n'th frame

M: the number of pixel

N: the number of line per frame

Here, FACTOR refers to constant 1/(M×N) to get a mean. MAD corresponds to first differentiation(df/dt, where 'f' means image signal in frame unit) and has high declination when scene changes occur between frames. If you differentiation is done one more time around the area of MAD with high declination, in other words, do a second secondly differentiation($d^2f/dt^2$) of orignal signal f, it is easier to detect the changes using threshold value due to its peak value. Difference of MAD (mean absolute difference), dMAD(dMAD (n)) corresponds to second differentiation. That is, dMAD(n)=|MAD(n)−MAD(n−1)|, wherein MAD(n) is an nth MAD, or a current MAD, and MAD(n−1) is an (n−1)th MAD, or a previous MAD. Therefore, dMAD could be utilized very usefully as scene change detection variable for successive frames. As to scenes moving in a wide range, value of dMAD is small whereas value of MAD is larger. That is to say, you can reduce scene change judgement error for scenes moving in a wide range by using dMAD.

DETAILED DESCRIPTION OF THE PREFERRED EMBODIMENT

Discussing the present invention in more detail and referring to attached drawings.

Figure 1:
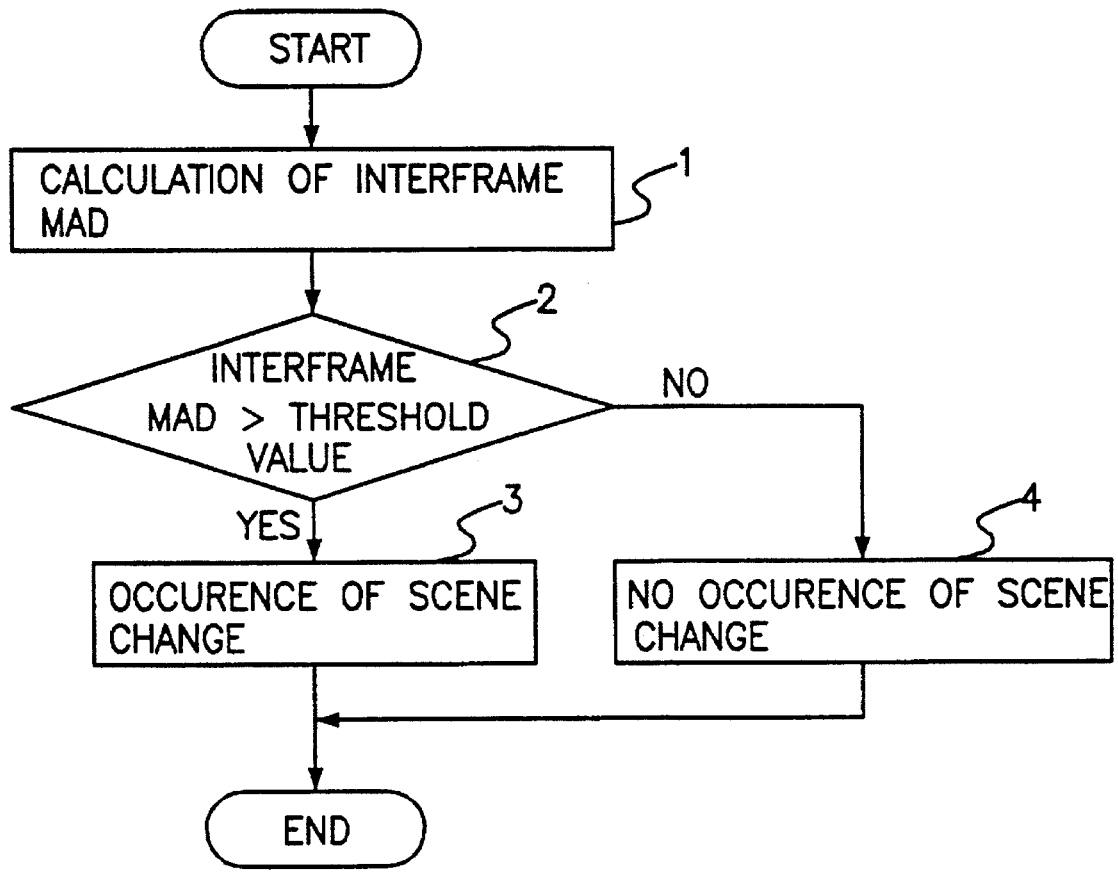
FIG. 1 is a flow chart illustrating procedure of scene change detection in accordance with a conventional method.
Figure 2:
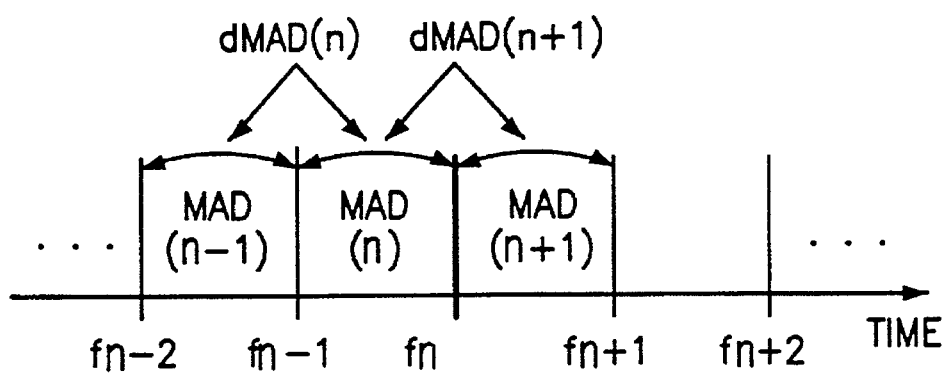
FIG. 2 is illustrating an example of MAD and dMAD in successive image signal.

FIG. 2 shows MAD and dMAD in successive image signals to explain the present invention. $f_n$ in the drawing refers to image signal of the 'n'th As to the second frame, as shown in the drawing, dMAD has no meaning so that MAD of current frame could be used. For example, if there has been scene change in the 'n'th frame, MAD(n) will be used to calculate dMAD (n+1) of the 'n+1'th frame. MAD(n) has high value regardless of existence of a scene change of $f_{n-1}$ since it is MAD between the last frame before the new scene, $f_{n-1}$ and the first frame of new scene, $f_n$. Suppose that there has been no scene change in $f_{n+1}$. Misjudgement that there has been scene change in $f_{n+1}$ will occur since dMAD(n+1) has a high value due to the low value of MAD(n+1). Therefore, dMAD may not be used for scene change judgement in the second frame of a new scene after a scene change.

Figure 3:
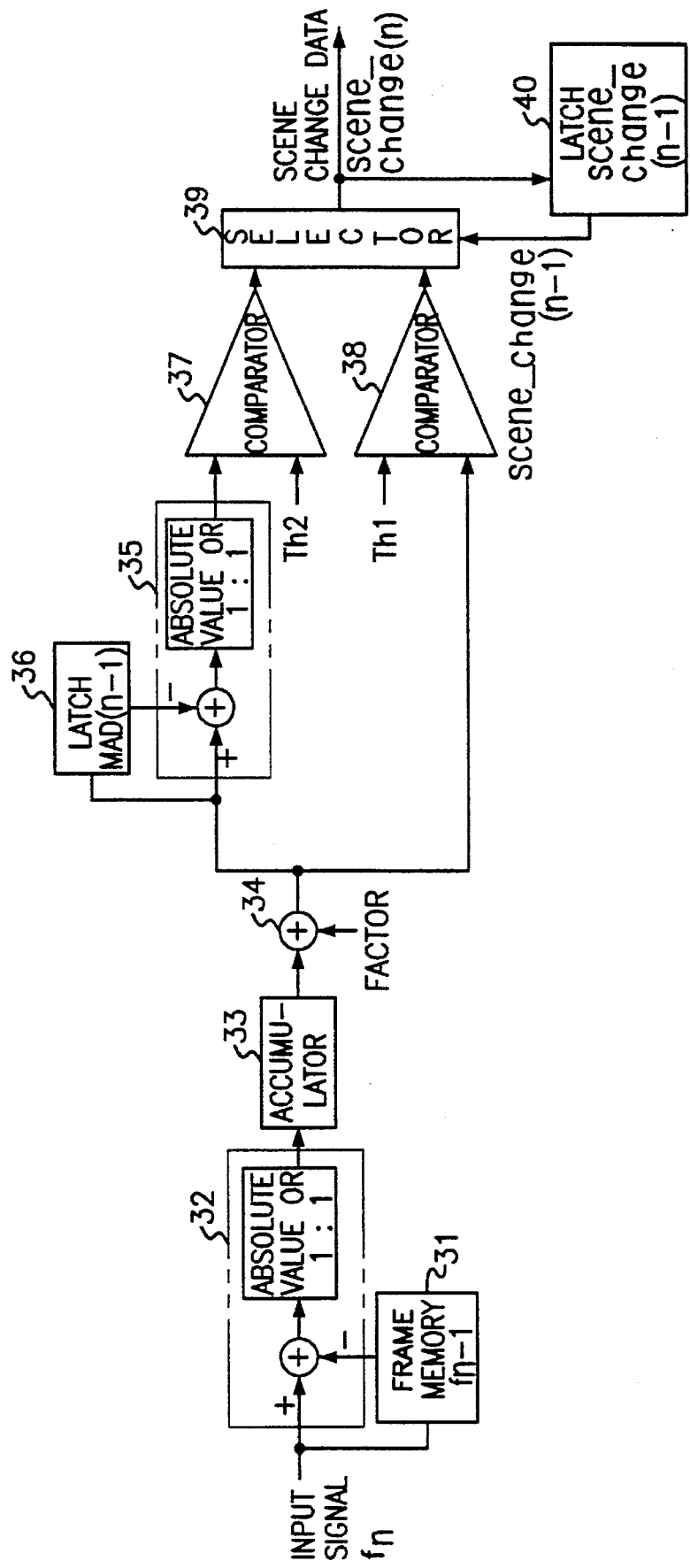
FIG. 3 is a block diagram illustrating scene change detector in accordance with the present invention.

FIG. 3 shows block diagram of scene change detector in accordance with the present invention.

As shown in FIG. 3, the scene change detector of the present invention includes the frame memory 31 for saving input signal $f_n$, the absolute difference calculator 32 for outputting absolute difference between the input signal $f_n$ and the output signal $f_{n-1}$ of the frame memory, the accumulator 33 for accumulating the absolute difference, the multiplier 34 for MAD multiplying output of the accumulator 33 by a constant factor to get MDA (Factor would have the number of the whole pixel of one frame to get the mean value in general). However, this invention uses shift register to simplify hardware implementation and takes into consideration the difference between the actual number of pixels and the value given using shift register in threshold values (Th1, Th2.), the latch 36 for saving the MAD from the multiplier 34 for one frame time, the absolute calculator 35 for calculating dMAD(n) between the output of the multiplier 34, MAD(n) and the output of the latch 36, MAD(n−1), the comparator 37 for comparing absolute difference from the absolute difference calculator 35 with threshold value Th2 so as to judge scene change, the comparator 38 for comparing only MAD(n) of corresponding frame from the multiplier 34 with threshold value Th1, the selector 39 for outputting scene change data after determining which of comparators, 37 or 38 is being used, the latch 40 for selecting one of outputs of two comparators 37 or 38 by providing scene change data scene_change(n−1) of previous frame saved in the selector 39 (For example, the selector 39 selects comparator 37 and processes the 'n'th frame using dMAD(n) since there is no scene change in the 'n−1'th frame if scene change data (n−1) is '0')

Figure 4:
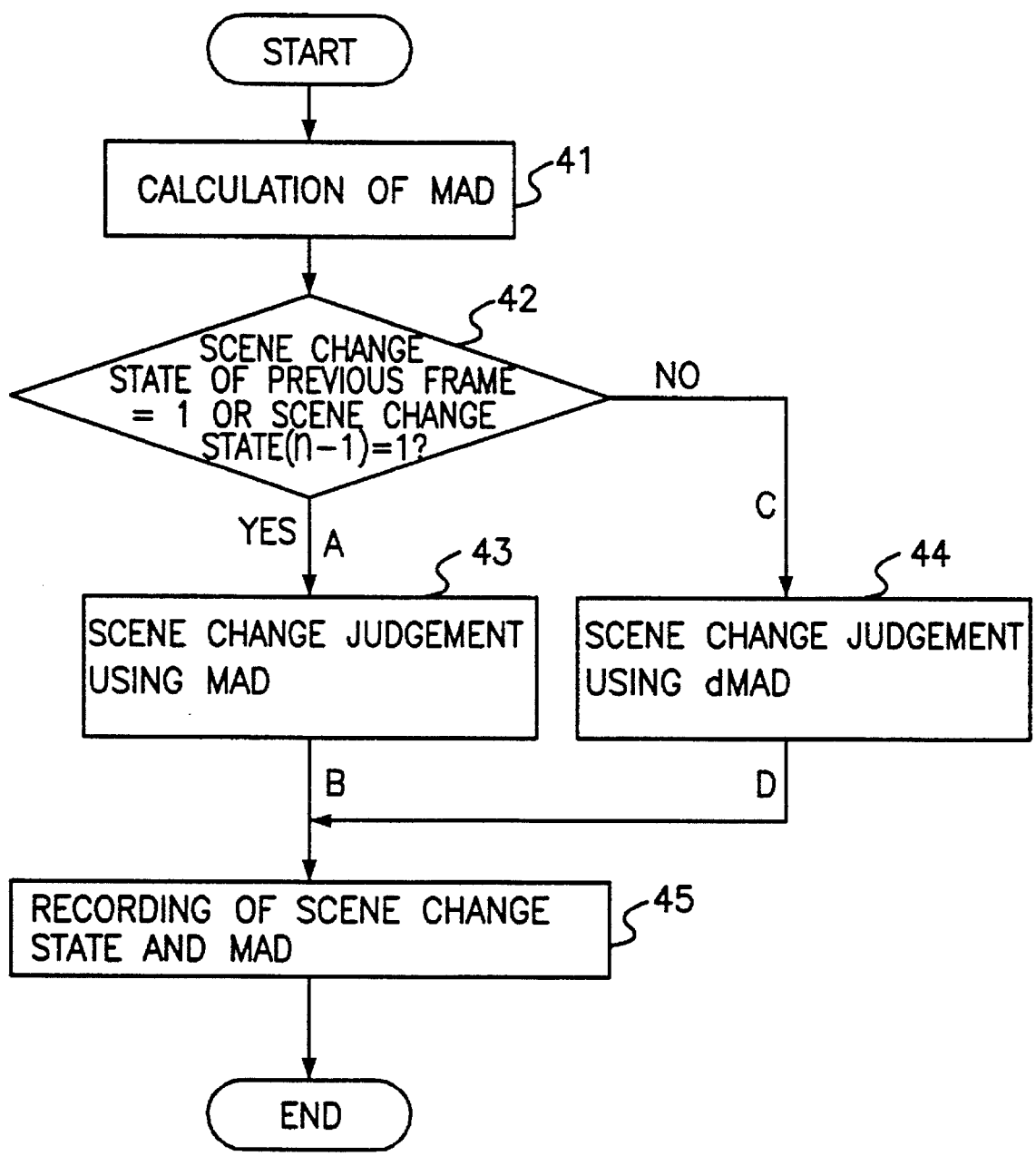
FIG. 4 is a flow chart illustrating: procedure of scene change detection in accordance with the present invention.

FIG. 4 shows processing flow of scene change detection in accordance with the present invention. As shown in FIG. 4, the scene change detection procedure includes step 41 for calculating MAD(n) of $f_n$ of the 'n'th input image frame, step 42 for checking the scene change judgement variable varied according to the scene change state of the previous frame, step 43 for judging the scene change using only MAD(n) since the current frame corresponds to the second frame of new scene if there has been a scene change in the previous frame $f_{n-2}$, in other words, the scene variable is '1' in the step 42, step 44 for judging the scene change using dMAD(n) when the scene variable is not '1' in the step 42, and step 45 for saving scene change state, scene_change(n) and MAD(n) of the 'n'th frame for the processing of the 'n+1'th frame.

Figure 5:
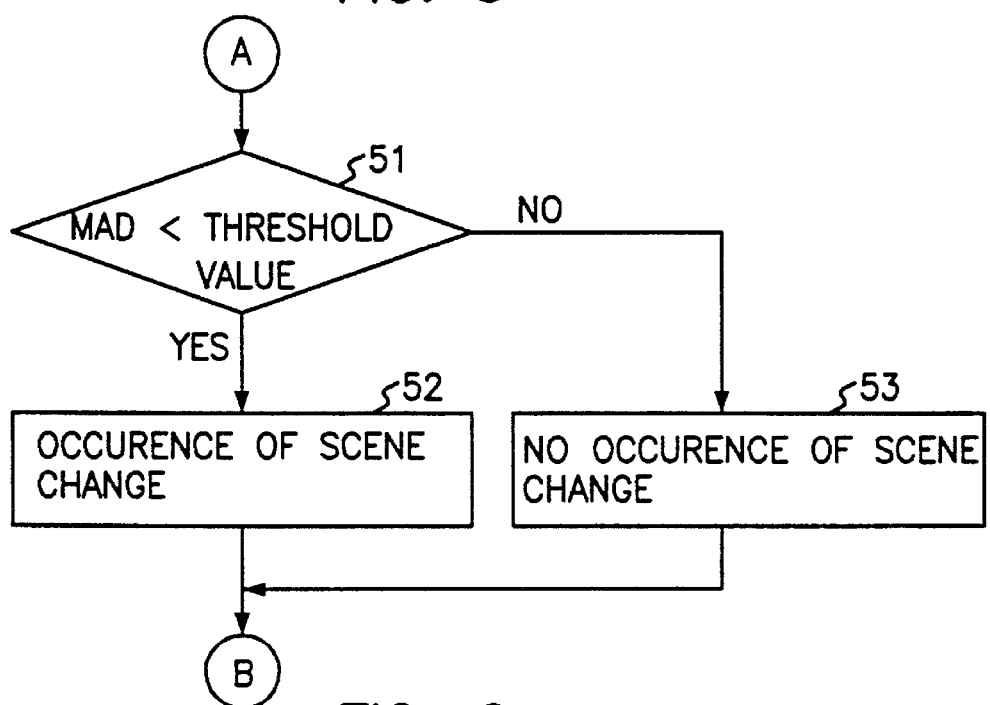
FIG. 5 is a flow chart illustrating procedure of scene change judgement using MAD in accordance with the present invention.

FIG. 5 shows a processing flow of scene change judgement method using MAD in accordance with the present invention. As shown in FIG. 5, scene change judgement procedure includes step 51 for comparing MAD(n) of current frame with threshold value, step 52 for recognizing no scene change and setting the scene change state scene_change(n) to '0', since there is no change between frames when MAD(n) is smaller than threshold value, step 53 for recognizing scene change and setting the scene change state scene_change(n) to '1', since there is a change between frames when MAD(n) is greater than or equal to threshold value.

Figure 6:
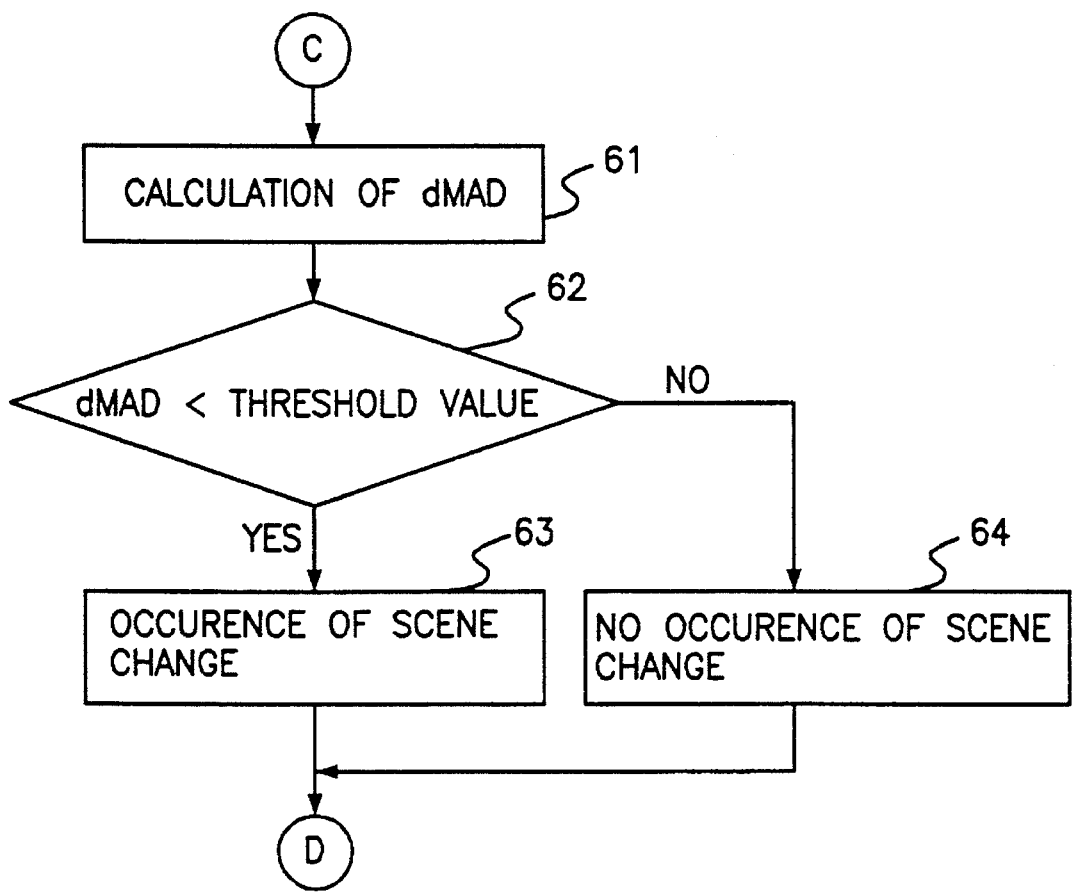
FIG. 6 is a flow chart illustrating procedure of scene change judgement using dMAD in accordance with the present invention.

FIG. 6 shows a processing flow of scene change judgement method using dMAD in accordance with the present invention. As shown in FIG. 6, scene change judgement procedure includes step 61 for calculating dMAD(n) from current MAD, MAD (n) and previous MAD, MAD (n−1), step 62 for comparing the dMAD(n) with threshold value, step 63 for recognizing successive scenes without scene changes and setting the scene change state scene_change(n) to '0' when dMAD(n) is smaller than threshold value, and step 64 for recognizing scene change and setting the scene change state to '1' when dMAD(n) is greater than or equal to threshold value, The present invention has the effect of reducing costs as well as achieving almost the same functions as the estimated movement method in scene change detection method.

What is claimed is:

1. An apparatus for detecting scene change using difference of mean absolute difference(dMAD) between image frames, the apparatus comprising:

frame memory for saving input signal $f_n$;

first absolute difference calculation means for calculating absolute difference between said input signal $f_n$ and output signal $f_{n-1}$ of said frame memory:

accumulation means for accumulating said absolute difference;

multiplication means for multiplying output of said accumulation means by a constant factor, thereby obtaining mean absolute difference(MAD);

first latch means for saving the MAD from said multiplication means during a frame time;

second absolute difference calculation means for calculating dMAD(n) between output of said multiplication means, MAD(n), and output of said first latch means, MAD (n−1);

first comparison means for comparing absolute difference from said second absolute calculation means with a second threshold value so as to judge scene change;

second comparison means for comparing only the MAD of corresponding frame from said multiplication means with a first threshold value;

selection means for selecting either said first comparison means or said second comparison means to be used and outputting scene change data; and second latch means for saving the scene change data from said selection means and providing the scene change data corresponding previous frame to said selection means so as to select said first or second comparison means.

2. A method for detecting scene change using mean absolute difference(MAD) and difference of mean absolute difference(dMAD) between image frames depending on whether a scene change variable is '1' or '0', respectively, said method comprising the steps of:

(a) calculating MAD of the 'n'th input image frame and checking whether scene change variable, which is used for current frame according to scene change of previous frame, is '1';

(b) caculating dMAD(n) from current MAD, MAD(n), and previous MAD, MAD(n−1), and comparing the dMAD(n) with threshold value;

(c) recognizing as successive scenes without scene changes and setting the scene change variable to '0' when dMAD(n) is smaller than threshold value at said step (b), and recognizing scene change and setting the scene change variable to '1' when dMAD(n) is greater than or equal to threshold value at said step (b);

(d) judging scene change only using MAD since current frame corresponds to the second frame of new scene when scene change variable is '1' at said step (a);

(e) judging scene change using dMAD as scene change variable when scene change variable is not '1' at said step (a); and (f) saving scene change variable and MAD of the 'n'th frame so as to use them for the processing of the 'n+1'th frame.

3. A method according to claim 2, wherein said procedure of judging at step (b) comprises the steps of:

(c−1) comparing MAD of current frame with threshold value; and (c−2) recognizing no scene change and setting the scene change variable to '0', since there is no change between frames when MAD(n) is smaller than threshold value at said step (c−1), and recognizing scene change and setting the scene change variable to '1', since there is change between frames when MAD(n) is greater than or equal to threshold value at said step (c−1).

* * * * *